Lewis, Price & Naylor.
Pile for Railroad Rails.
No. 8,694. Reissued Jul. 23, 1867.
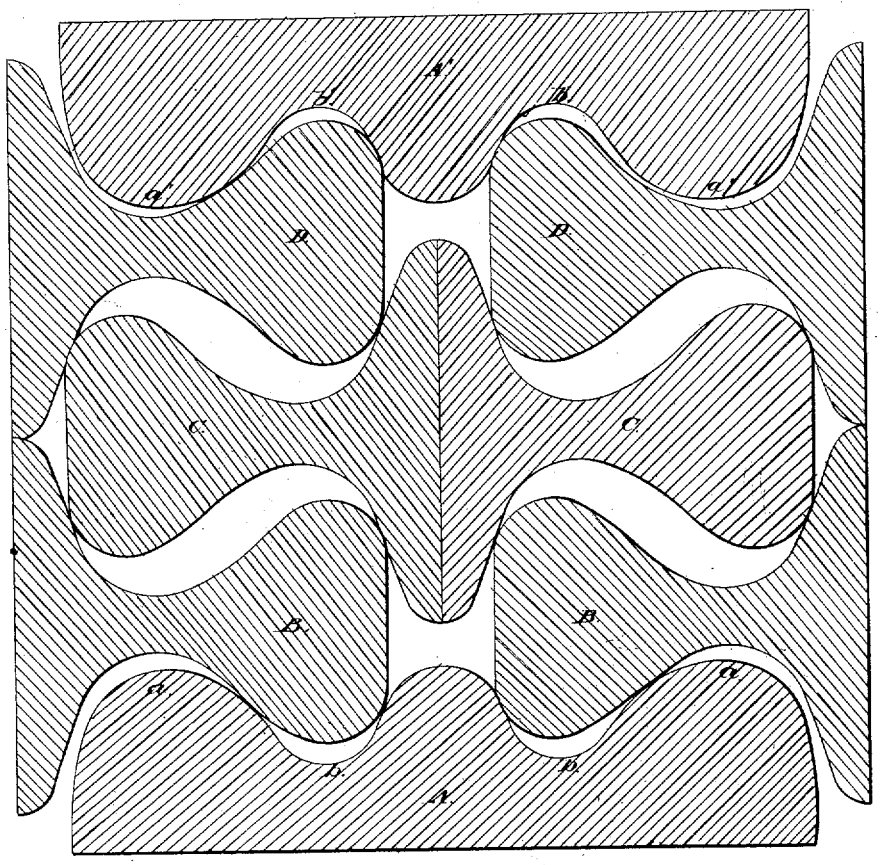
Witnesses:
Henry Meems
O L Topliff
Inventors:
Wm Lewis
John Price
Francis Naylor
per Munn & Co
Attys
THE GRAPHIC CO. PHOTO-LITH. 39 & 41 PARK PLACE, N.Y.

United States Patent Office.

WILLIAM LEWIS, JOHN PRICE, AND FRANCIS NAYLOR, OF DANVILLE, PENNSYLVANIA.

*Letters Patent No.* 43,593, *dated July* 19, 1864; *reissue No.* 2,697, *dated July* 23, 1867.

IMPROVED FAGOT FOR RAILWAY RAIL.

The Schedule referred to in these Letters Patent and making part of the same.

TO ALL WHOM IT MAY CONCERN:

Be it known that we, WILLIAM LEWIS, JOHN PRICE, and FRANCIS NAYLOR, all of Danville, in the county of Montour, and State of Pennsylvania, have invented a new and useful improvement in Piles for Rolling Railroad Rails; and we do hereby declare that the following is a full, clear, and exact description thereof, which will enable others skilled in the art to fully understand and use the same, reference being had to the accompanying drawing, forming a part of this specification. Said drawing represents a side elevation of our improvement.

Similar letters of reference indicate like parts.

Our invention relates to a method of forming piles or fagots (preparatory to welding and re-rolling) of short bar iron, as well as pieces of old rails, and of top pieces, or of top and bottom pieces, of steel or other similar metal, having corrugations or projections and grooves on their inner faces, substantially as hereinafter set forth.

In the re-rolling of railroad rails or the rolling of bar iron from old railroad rails, considerable trouble and inconvenience have always been experienced in forming, combining, and keeping together the short lengths of the old rails in suitable piles or fagots while undergoing the process of re-heating in the reverberatory furnace. This difficulty has been due to the peculiar irregular form of the rails, which is such that the short bars thereof cannot be piled or fagoted like rectangular bars, and are therefore liable to fall apart when submitted to the action of the furnace and the disturbance of charging the same during the heating operation.

One of the objects of our invention is to construct a fagot with a top piece or top and bottom pieces of steel or similar metal, corrugated or so formed that when rolled into a railroad rail the corrugations of the top or top and bottom pieces will project into and interlock the iron body of the rail.

Another of the objects of our invention is to obviate the above-mentioned difficulty, and we succeed in combining the said short bars of old rails into compact piles or fagots in the following manner:

We first provide a bottom plate or layer, A, of corrugated form, as shown, made of old rails, puddled iron, or re-heated puddled iron or steel, and upon the bottom plate A we lay in sidewise position the rail bars B B, the projections *a a* in plate A fitting into the necks of the rails and the heads of the rails fitting into the depressions *b b* of the plate A, as shown. Upon the upper sides of the bars B B we now lay in sidewise position two other rail bars, C C, the bases of which abut against each other, and their heads fit into the necks of the rails B B, underneath them. Upon the bars C C are now placed two more rail bars, D D, with their heads turned inward and fitted into the necks of the bars C C, underneath them, as shown, and upon the top of the bars D D we now place a corrugated top plate, A′, of which the end projections *a′ a′* fit into the necks of the rails D D, and the heads of the rails D D fit into the depressions *b′ b′* of plate A, as shown. The several projections and depressions of the plates A A′, with the rails laid upon them and upon each other, as shown, interlock with each, so as to form a firm, compact pile, which cannot easily be broken apart by the charging or other disturbances during the heating operation, and which is easy to move and place in the rolls, and it is not liable to laminate, owing to the close interlocking of the several bars and the increased welding surface. Bar iron may also be piled and interlock in like manner with said steel or similar metal cap, and be held firm in its place by said grooves and projections. The top plate A′, which is to form the head or upper surface of the bar or rail, may be made of peculiar metal or metal different from the body, if desirable. The said plate A′ is or may be composed of re-heated iron or steel, or above the plate A′ there may be placed still another plate composed of steel, or a metal plate having such qualities as it may be desired to impart to the upper surface of the rolled bar or rail.

We do not confine ourselves to the use of any particular size of corrugated plates A A′, nor to any particular number of interlocking rails or bars for fagots for railroad rails.

1. We claim the corrugated steel slabs or form pieces A A′ for fagots for railroad rails.

2. We also claim forming the piles for the manufacture of steel-faced rails by the combination of iron bars with facing slabs of cast steel, provided with intermediate projections on their inner surfaces for the purpose of facilitating the welding of the steel to the iron, substantially as set forth.

In testimony whereof we have hereunto subscribed our names.

WM. LEWIS,
JOHN PRICE,
FRANCIS NAYLOR.

Witnesses:

JOTHAM SMITH, LYMAN COBB, Jr., } as to WILLIAM LEWIS.

F. W. CONRAD, ADAM G. LAENGERT, } as to JOHN PRICE.

JOHN McDERMOTT, JAMES M. JONES, } as to FRANCIS NAYLOR.